(12) United States Patent
Margalit

(10) Patent No.: US 10,814,295 B2
(45) Date of Patent: *Oct. 27, 2020

(54) WEIGHING AND MIXING SYSTEM

(71) Applicant: O.E.D.A. LIAD HOLDINGS (2006) LTD., Misgav Industrial Park (IL)

(72) Inventor: Eli Margalit, Moshav Yaad (IL)

(73) Assignee: Ampacet Corporation, White Plains, NJ (US)

( * ) Notice: Subject to any disclaimer, the term of this patent is extended or adjusted under 35 U.S.C. 154(b) by 368 days.

This patent is subject to a terminal disclaimer.

(21) Appl. No.: 15/111,373

(22) PCT Filed: Jan. 12, 2015

(86) PCT No.: PCT/IL2015/050041
§ 371 (c)(1),
(2) Date: Jul. 13, 2016

(87) PCT Pub. No.: WO2016/107517
PCT Pub. Date: Jul. 23, 2015

(65) Prior Publication Data
US 2016/0339404 A1 Nov. 24, 2016

(30) Foreign Application Priority Data

Jan. 16, 2014 (IL) .......................... 230499
Jan. 30, 2014 (IL) .......................... 230756

(51) Int. Cl.
*B01F 13/10* (2006.01)
*B29B 9/16* (2006.01)
(Continued)

(52) U.S. Cl.
CPC ...... *B01F 13/1058* (2013.01); *B01F 15/0251* (2013.01); *B01F 15/0445* (2013.01);
(Continued)

(58) Field of Classification Search
CPC .............. B01F 13/1058; B01F 15/0251; B01F 15/0445; B29C 31/06; B29C 47/1009;
(Continued)

(56) References Cited

U.S. PATENT DOCUMENTS 2,694,510 A 11/1954 Kindseth
2,727,713 A 12/1955 Kindseth et al.
(Continued)

FOREIGN PATENT DOCUMENTS

CN 101703900 A 5/2010
DE 29515725 U1 6/1996
(Continued)

OTHER PUBLICATIONS

European Search Report for corresponding international application EP15737272.3, dated Jun. 23, 2017, 8 pages.
(Continued)

*Primary Examiner* — Queenie S Dehghan
(74) *Attorney, Agent, or Firm* — Smith Gambrell & Russell, LLP

(57) ABSTRACT

The invention is a weighing and mixing system for the preparation of mixtures of components required by processing machines for the manufacture of plastic products. In particular the invention is suitable for the preparation of weighed mixtures comprised of at least two different masterbatches in order to obtain the color shade desired for a specific plastic product.

6 Claims, 4 Drawing Sheets

(51) Int. Cl.
| | |
|---|---|
| *B29B 9/06* | (2006.01) |
| *B29B 7/24* | (2006.01) |
| *B01F 15/04* | (2006.01) |
| *B01F 15/02* | (2006.01) |
| *B29C 31/06* | (2006.01) |
| *B29B 7/60* | (2006.01) |
| *B29C 48/285* | (2019.01) |
| *G01G 13/02* | (2006.01) |
| *B29B 7/12* | (2006.01) |
| *B29B 9/12* | (2006.01) |

(52) U.S. Cl.
CPC ............... *B29B 7/603* (2013.01); *B29B 9/16* (2013.01); *B29C 31/06* (2013.01); *B29C 48/286* (2019.02); *B01F 2215/0049* (2013.01); *B29B 7/12* (2013.01); *B29B 7/244* (2013.01); *B29B 9/06* (2013.01); *B29B 9/12* (2013.01); *B29C 48/288* (2019.02); *B29C 2948/926* (2019.02); *B29C 2948/9218* (2019.02); *B29C 2948/92104* (2019.02); *B29C 2948/92333* (2019.02); *B29C 2948/92676* (2019.02); *B29C 2948/92828* (2019.02); *G01G 13/024* (2013.01)

(58) Field of Classification Search
CPC ...... B29C 47/1027; B29C 2947/92104; B29C 2947/9218; B29C 2947/92333; B29C 2947/926; B29C 2947/92676; B29C 2947/92828; B29B 7/244; B29B 7/28; B29B 7/12; B29B 9/06; B29B 9/16; B29B 9/12; G01G 13/024
See application file for complete search history.

(56) References Cited

U.S. PATENT DOCUMENTS

| | | | | |
|---|---|---|---|---|
| 2,994,459 | A | * | 8/1961 | Tedeschi ................ B29C 31/06 222/295 |
| 3,102,603 | A | | 9/1963 | Kerr |
| 3,822,866 | A | | 7/1974 | Daester et al. |
| 3,994,404 | A | | 11/1976 | Kisovec |
| 4,955,550 | A | * | 9/1990 | Satake ................ B01F 15/0445 222/14 |
| 5,148,943 | A | | 9/1992 | Moller |
| 5,627,346 | A | * | 5/1997 | Weibel ..................... B01F 3/18 141/83 |
| 6,089,745 | A | | 7/2000 | Feistkorn et al. |
| 6,155,709 | A | | 12/2000 | O'Callaghan |
| 6,402,363 | B1 | * | 6/2002 | Maguire ................... B01F 3/18 366/141 |
| 6,474,972 | B1 | | 11/2002 | Endo et al. |
| 2003/0024955 | A1 | * | 2/2003 | Maguire ................... B01F 3/18 222/559 |
| 2003/0150873 | A1 | | 8/2003 | Margalit |

FOREIGN PATENT DOCUMENTS

| | | |
|---|---|---|
| DE | 29714643 U1 | 11/1997 |
| DE | 102010003814 A1 | 3/2017 |
| JP | 49-69359 S | 7/1974 |
| JP | 50-27380 S | 9/1975 |
| JP | 2-296114 A | 12/1990 |
| JP | 7-55542 A | 3/1995 |
| JP | 2003-004513 A | 1/2001 |
| JP | 2011-020268 | 4/2001 |
| JP | 2002-322290 A | 11/2002 |
| JP | 3428692 B2 | 5/2003 |
| JP | 2010-65126 A | 3/2010 |
| JP | 2013-169720 A | 9/2013 |
| WO | 2000/059708 A1 | 10/2000 |
| WO | 2008149190 A1 | 11/2008 |
| WO | 2011/007712 A1 | 7/2010 |
| WO | 2013182869 A1 | 12/2013 |

OTHER PUBLICATIONS

International Search Report dated May 10, 2015 from corresponding International Patent Application No. PCT/IL2015/050041, 4 pages.
Written Opinion dated May 10, 2015 from corresponding International Patent Application No. PCT/IL2015/050041, 5 pages.
Japanese Office Action—Notice of Reasons for Rejection dated Nov. 19, 2018 from corresponding Japanese Patent Application No. 2016/564454, 12 pages.
European Office Action dated May 20, 2019 from corresponding European Patent Application No. 15737272.3, 6 pages.

* cited by examiner

WEIGHING AND MIXING SYSTEM

FIELD OF THE INVENTION

The invention is from the field of weighing material for industrial processes. Specifically the invention is from the field of weighing granules of material.

BACKGROUND OF THE INVENTION

In the modern world plastics are the material of choice for the manufacture of a seemingly unlimited number of products. These products are produced by a variety of industrial processes, e.g. injection molding, blow molding, extrusion, and 3-D printers. The raw material that is fed into the machines used to produce the final products is a mixture consisting of: polymers (called resin in the industry) in the form of small beads, colorants and other additives, e.g. UV inhibitors. The colorants and other additives are supplied as masterbatches, which are concentrated mixtures of pigments and/or additives encapsulated during a heat process into a carrier resin which is then cooled and cut into a granular shape.

Herein the term masterbatch is used to refer to color masterbatches. Herein the terms "bead", "pellet", and "granule" are used interchangeably to refer to a small piece of material typically having a weight in the range of 0.01 g-0.04 g.

Today it is customary in the plastic industry to feed the processing machines e.g. injection molding machines, blow molding machines, extrusion machines, either with pre-mixed plastic formulations or, as it is applied in most of the cases, by feeding the processing machines directly by means of gravimetric blenders that weigh and blend the various components based on their weight settings. The premixed formulations are prepared by mixing resins, pigments and additives in a molten state to achieve the desired qualities and color.

In more detail, with the gravimetric blenders each component is dispensed separately into a single weighing chamber and then all components are dropped into a mixing chamber, which delivers a homogenous blend to the plastic processing machine through a free fall hopper. The gravimetric blender can be installed on the throat of the processing machine, next to the machine, or at a central blending area relatively remote from the machine.

At present, the desired color of the plastic product is achieved by feeding the masterbatch, which is the color additive and has the same shade as the required shade of the final product, through the gravimetric blender or by a gravimetric or volumetric feeder installed on the throat of the processing machine.

It would be very advantageous for a plastic processing company that uses a lot of color additives (masterbatches), to implement a new method of producing the desired shade by either adding a selected combination from a given number of masterbatches into the processing machines or to produce a new homogeneous masterbatch by passing a selected combination of masterbatches through an extruder and pelletizing machine to form new pellets with the desired shade. In order to implement this method successfully a very high degree of accuracy is required that is not obtainable with present day feeder systems.

It is therefore a purpose of the present invention to provide a weighing and mixing system that can weigh separately each component of a mixture of granules with an accuracy that can be less than 0.03 gram.

Further purposes and advantages of this invention will appear as the description proceeds.

SUMMARY OF THE INVENTION

In a first aspect the invention is a weighing and mixing system for the preparation of a mixture of granular components required by a processing machine for the manufacture of a plastic product. The system comprises:
  a. at least one separate weighing unit for each one of the components of the mixture; each weighing unit comprising a material hopper comprising at least one first opening and at least one second opening, a weighing hopper, a load cell and at least one feeding system; and
  b. a chamber configured to receive the weighed components from all of the weighing units and to produce a homogeneous blend that can be delivered to the processing machine.

In the weighing and mixing system of the invention each weighing unit is configured to deliver a predetermined weight of the component to the chamber using a two stage weighing process. In the first weighing stage, a controlled amount of material equal to a little less than the weight required for the final batch is allowed to fall by gravity from the material hopper through the at least one first opening into the weighing station and onto the load cell. In the second weighing stage, the at least one feeding system is activated to cause a small amount of material, which falls by gravity into the feeding system through the at least one second opening, to fall into the weighing hopper until the total weight of material weighed by the load cell is equal to the required weight, whereupon the activation of the at least one feeding system is halted and the weighed component is allowed to flow by gravity into the chamber.

Each feeding system comprises: (a) one of: an auger, a screw, a dosing cylinder, a feed tube, a vibratory mechanism or a conveyer belt and (b) a motor that rotates the auger, screw, dosing cylinder or feed tube or drives the conveyor belt or vibratory mechanism.

In embodiments of the weighing and mixing system of the invention the feed tube comprises a hollow interior section having a tightly fitted compression spring inserted into its front end and an opening to allow granules of material that fall from the material hopper through the second opening to enter the hollow interior section. In these embodiments the diameter of the wire of which the spring is made and the diameter of the interior of the spring are chosen such that when the motor is activated causing the feed tube to rotate about its longitudinal axis, granules of material in the hollow interior section of the feed tube travel in single file in a spiral path through the interior of the spring until they reach the end of the spring and drop off one at a time into the weighing hopper. In these embodiment the feed tube can be surrounded by a cylindrical sleeve and a threaded section can be created on the outer wall of the feed tube, wherein the threads in the threaded section are created in the opposite direction to that in which the feed tube is rotated in order to push any granules that attempt to enter the space between the feed tube and the sleeve back towards the opening of the feed tube.

In embodiments of the weighing and mixing system of the invention the weighing unit is configured to achieve the desired weight with an accuracy of less than 0.03 g.

In embodiments of the weighing and mixing system of the invention the components of the mixture are chosen from: resins, masterbatches, and additives.

In embodiments of the weighing and mixing system of the invention the components of the mixture comprise at least two masterbatches of different color shades that are combined by the system to produce a mixture that a processing machine will utilize to manufacture a plastic product having a single desired color shade.

In a second aspect the invention is a masterbatch having a desired color shade. The masterbatch is comprised of at least two masterbatches, each having a different color shade, wherein the at least two masterbatches are combined by the weighing and mixing system of the first aspect of the invention and then passed through an extruder and pelletizing machine to form new pellets with the desired color shade.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention is a weighing and mixing system for the preparation of mixtures of components required by the processing machine for the manufacture of plastic products. In particular the invention is suitable for the preparation of weighed mixtures comprised of at least two different masterbatches in order to obtain the color shade desired for a specific plastic product.

Due to its accuracy, the system can produce a mixture of all the molded components, e.g. masterbatches, additives and resins, that will be fed to the processing machine through its free fall hopper, or only a mixture of the masterbatches and additives that will be fed to the machine through a single-component gravimetric or volumetric feeder located at the throat of the machine. The first option is more suitable for small sized throughput applications.

Unlike a prior art gravimetric blender, in which each component is dispensed separately into a single weighing chamber and then all components are dropped into a mixing chamber which delivers a homogenous blend to the processing machine, the system of the invention is equipped with a weighing chamber for each component. Therefore the weighing will be done in parallel, thus enabling the use of much smaller load cells and accordingly much better accuracy, yet with a relatively high throughput.

In order to achieve extreme accuracy and maximal speed the weighing unit first dispenses a weight that is close to but slightly less than the specified set point. A second and final dispensing is performed using a feeding system comprising an auger, screw, conveyer belt, or dosing cylinder, or a vibratory mechanism—each of which is able to dispense a small amount of material at a time—and a motor that rotates the auger, screw, or dosing cylinder or drives the conveyor belt or vibratory mechanism.

Figure 1:
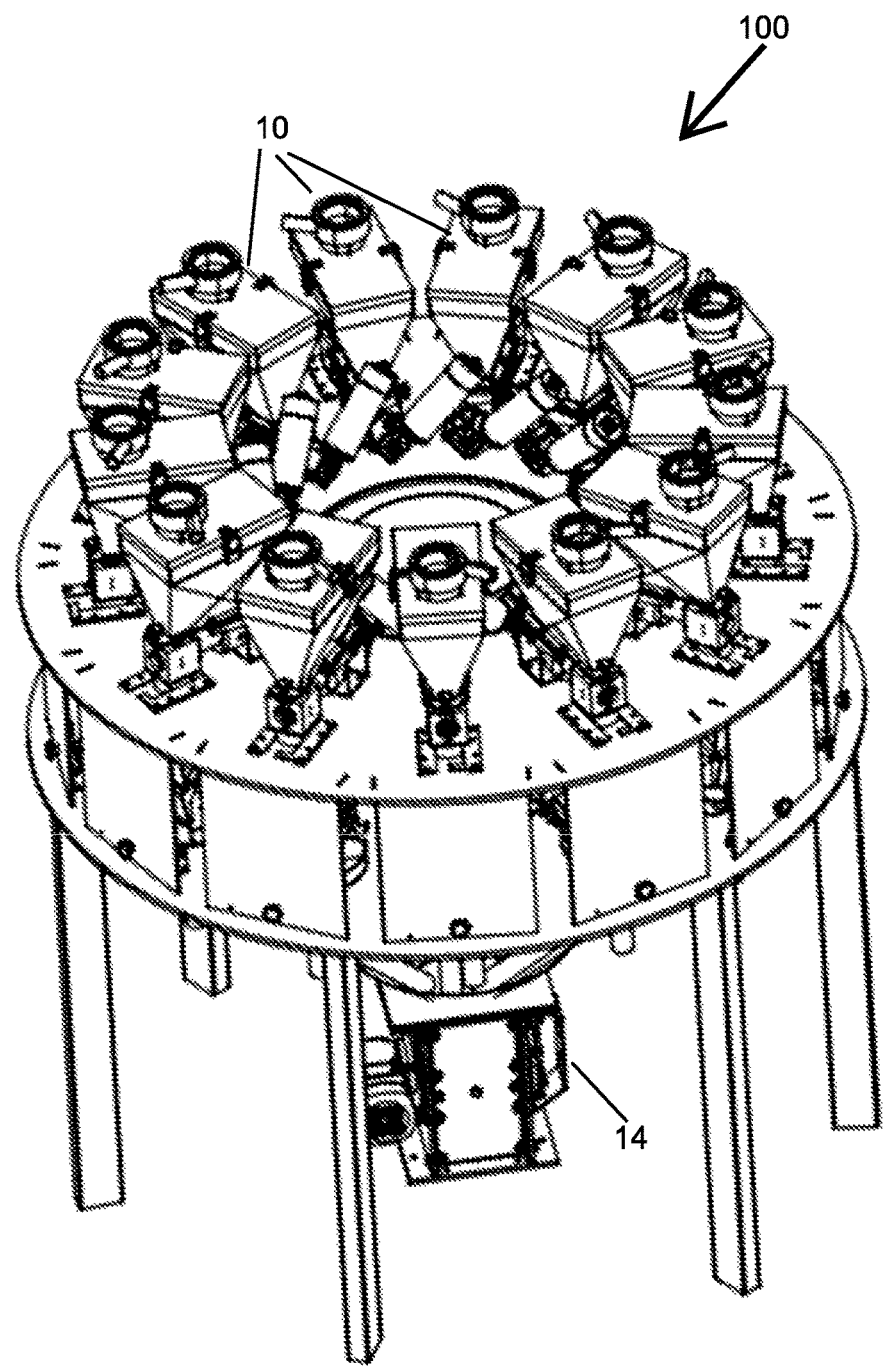
FIG. 1 is a schematic perspective view of the system of the invention.

FIG. 1 is a schematic perspective view of the system of the invention. The system 100 is a modular one that can be comprised of one or more weighing units 10 arranged in a way that allows the material weighed in each of the units to fall through individual chutes via a common funnel into a chamber 14, that combines the output of all of weighing units 10 into a uniform mixture that can be fed into a processing machine. Each of the weighing units 10 contains a different type of resin, masterbatch, or additive in granular form. A computer (not shown in the figures) controls the operation of each of the separate weighing units 10 in order to supply the exact weight of each of the individual components to the mixing machine. To prepare a given mixture, the computer will activate only the weighing units 10 that contain the material required for that mixture according to a formulation that has been preloaded into the computer. Herein the individual weighing units 10 of system 100 will be called identical since they are structurally and functionally identical but in a commercial application may be of different sizes to accommodate different quantities of material.

Figure 2:
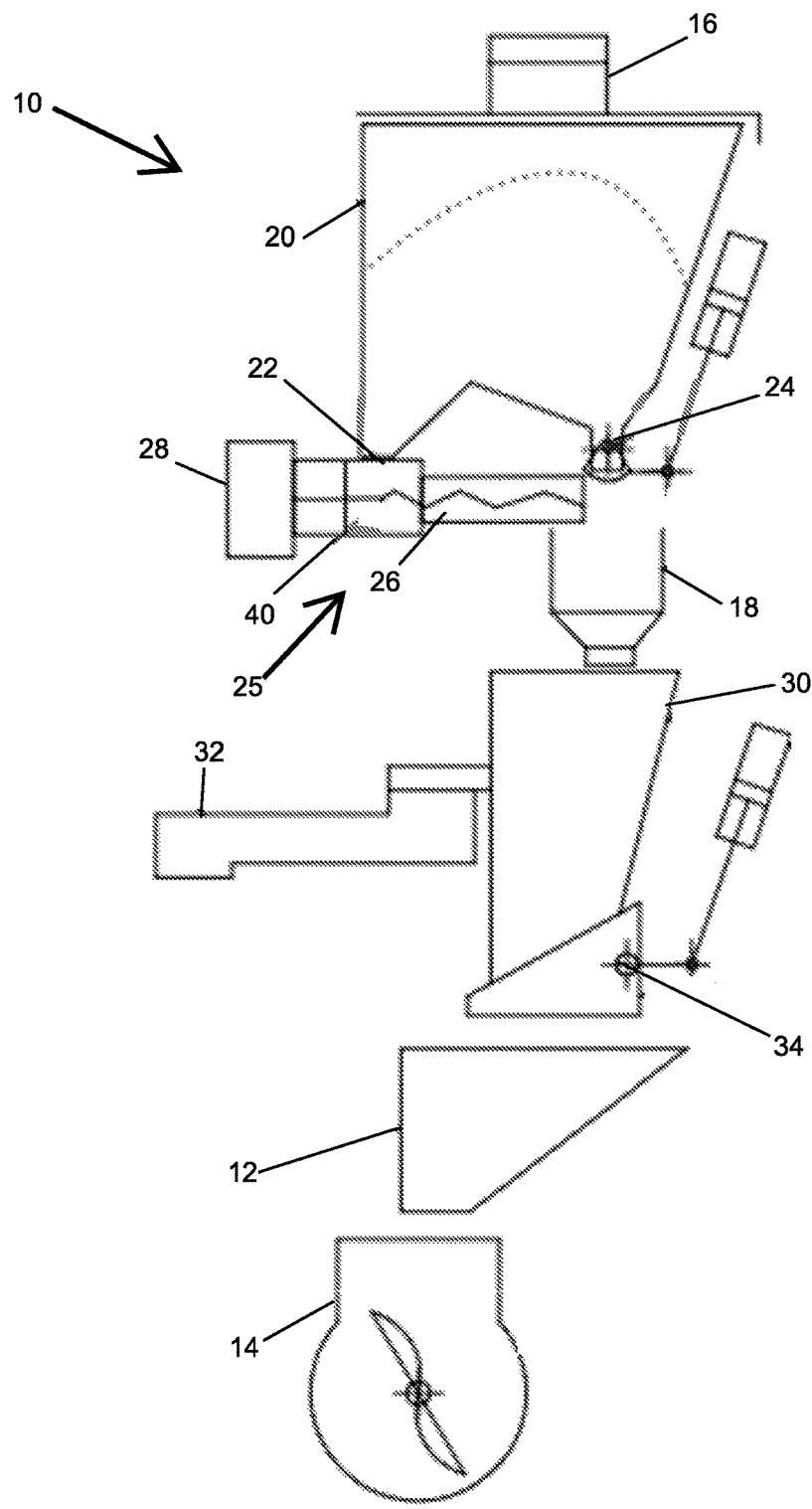
FIG. 2 schematically shows a weighing unit of the invention.

FIG. 2 schematically shows one of the weighing units 10 of the invention. In many ways weighing unit 10 is similar to conventional weighing systems that are well known in the art; therefore most of the components of the unit 10 will not be described in detail herein.

Weighing unit 10 comprises a vacuum (Venturi) feeder 16 that draws one type of material, i.e. resin, masterbatch, or additive, into material hopper 20. Hopper 20 has a first opening 24 with a feeding mechanism e.g. a flap, an auger, a screw, a vibratory mechanism, or paddles, at its bottom and a second opening 22. In a first weighing stage, the first opening 24 is opened and closed and the feeding mechanism is activated when required by an element (not shown in the figures) that is controlled by a system computer (not shown in the figures) to allow a controlled amount of material to fall by gravity into weighing station 30 where it is weighed on load cell 32. When the weight of material that has entered weighing station 30 is a little less than the weight required for the final batch, the computer causes flap 24 to close.

In embodiments of the system, for example to allow faster flow of material from material hopper 20 into weighing station 30 during the first stage of the weighing procedure, the material hopper has two or more "first openings" 24 with feeding mechanisms.

Second opening 22 in the bottom of hopper 20 allows material to fall by gravity from hopper 20 into the throat 40 of a feeding system 25 and from the throat of the feeding system into the interior of a cylindrical sleeve 26. In a second stage of the weighing procedure, a motor 28, controlled by the system computer causes an auger, screw, or feed tube to rotate within the cylindrical sleeve 26 to force granules of material that have entered sleeve 26 to be pushed towards the end of the tube where they fall into the weighing hopper 30. When the total weight of the material introduced into weighing hopper 30 from opening 24 and through feeding system 25 and weighed by load cell 32 is equal to the required weight, then the system computer stops the motor 28 and opens flap 34 to allow the material to flow by gravity through funnel 12 into chamber 14, where the material is joined by material of other types that has been weighed in parallel by other independent units identical to weighing unit 10.

Embodiments of the weighing unit may comprise two or more "second openings" 22 in the bottom of hopper 20 each of which allows material to fall by gravity from hopper 20 into the throat 40 of a separate feeding systems 25.

Figure 3:
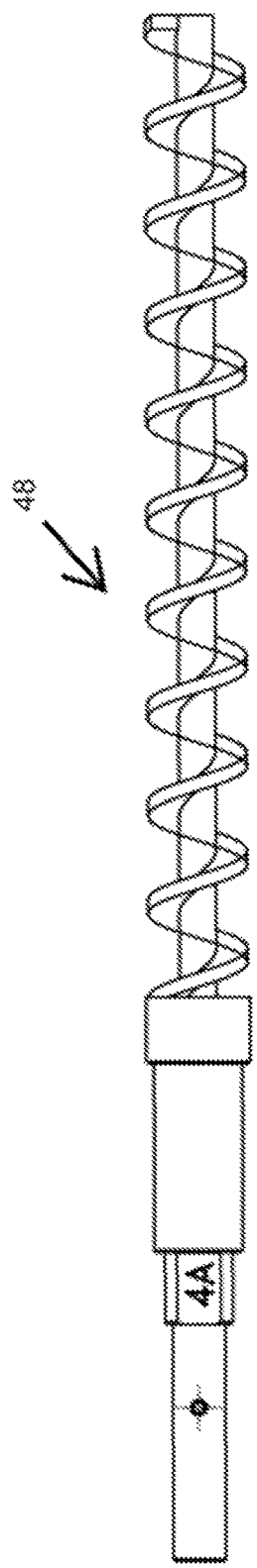
FIG. 3 schematically shows a conventional auger.

The auger or screw inside the cylindrical tube 26 can have many different forms depending on the weighing accuracy desired and/or the dimensions of the material being weighed. For example, FIG. 3 shows a conventional auger having a course pitch of about 20 mm and FIG. 4 an auger with a fine pitch of about 3 mm that is designed for use in weighing powders. Each rotation of the auger shown in FIG. 3 would push a large number of typical granules used in the plastic industry into the weighing hopper (estimated number is about 200 granules weighing 0.02 gram/granule); therefore it could be used in applications in which the absolute accuracy need not be high or in which each batch is comprised of large quantities of material so that the relative accuracy would be sufficient to obtain the desired mixture. In another embodiment the feeding system might comprise a conveyor belt, dosing cylinder, or vibratory mechanism.

Figure 5:
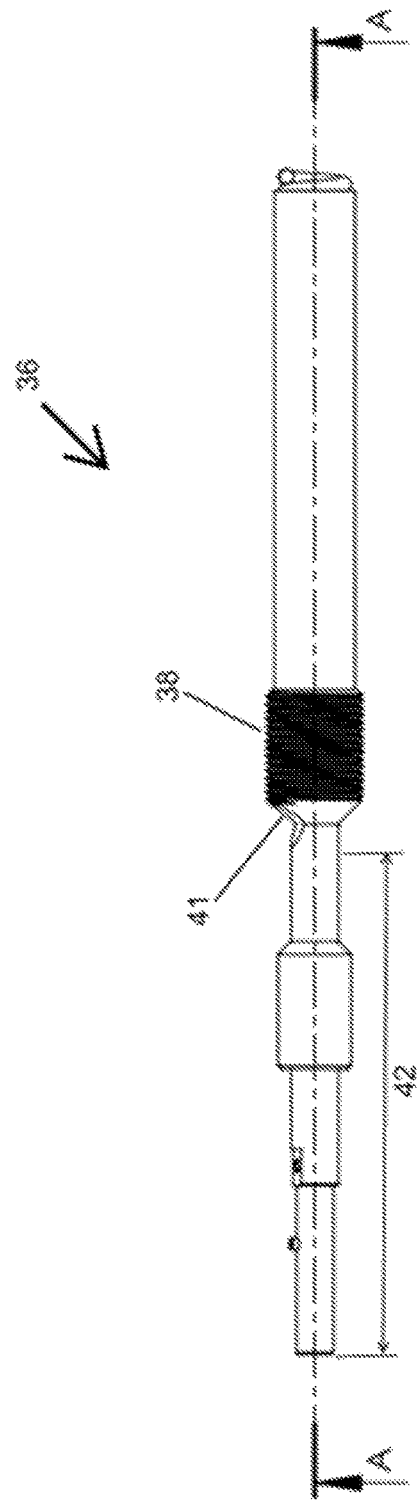
FIG. 5 schematically shows a side view of the feed tube of the invention.
Figure 6:
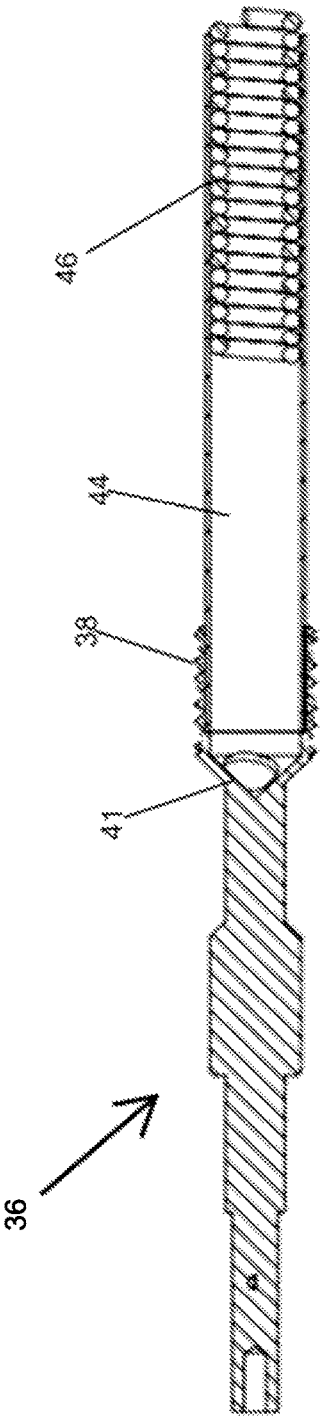
FIG. 6 schematically shows a cross sectional view of the feed tube of the invention.

FIG. 5 schematically shows a side view and FIG. 6 a cross-sectional view of a feed tube 36 that has been designed by the inventors for dosing one pellet in each rotation. The rear section 42 of feed tube 36 is solid and machined to couple with motor 28 configured to rotate feed tube 36 about its longitudinal symmetry axis. The interior 44 of the remainder of the length of feed tube 36 is hollow. On each rotation of feed tube 36 opening 41 will be aligned with the throat 40 of the feeding system below an opening 22 in the bottom of material hopper 20 (see FIG. 2). When this happens granules of material enter into the hollow interior 44 of feed tube 36.

At the front end of the feed tube 36 is tightly fitted a compression spring 46. The diameter of the wire of which spring 46 is made and the diameter of the hollow interior of the spring are chosen such that a single granule of the material that enters the interior of the front end of the feed tube 36 will fit into the roughly triangular space between adjacent coils of the spring. As feed tube 36 rotates, granules of material travel in single file along a spiral path through the interior of spring 46 until they reach the end of the spring and drop off one at a time through funnel 18 and from there into the weighing hopper 30 where they are added to the weight of the material on the load cell.

In the weighing unit 10 the feed tube 36 is surrounded by a cylindrical sleeve 26. In order to prevent granules of material from moving between the outer side of the wall of feed tube 36 and the inner wall of the sleeve 26 and eventually hindering or preventing feed tube 36 from rotating, a threaded section 38 is created on the outer wall of feed tube 36. The threads in threaded section 38 are created in the opposite direction to that in which the feed tube 36 is rotated in order to push any granules that attempt to enter the space between the feed tube and the sleeve back towards the opening 41 of the feed tube. When the feeding system 25 comprises a feed tube 36, the computer causes flap 24 to close ending the first weighing stage when the weight of material that has entered weighing station 30 is equal to, for example, 0.1-20 grams less than the weight required for the final batch.

Since the weight of one pellet of typical masterbatch is about 0.02 g, the system using feed tube 36 is able to achieve the desired weight with an accuracy of less than 0.03 g. This accuracy is essential in order to produce a mixture of masterbatches in order to obtain a desired shade in particular in case of small mixtures of component of about few kilograms.

The accuracy of about 0.03 g for each component is far beyond the accuracy of any existing gravimetric blender or any other system used to prepare a mixture of components for a processing machine in the plastic industry.

The product that leaves the chamber 14 is a uniform mixture of the individual pellets that were weighed in the individual weighing units. This mixture, after melting in a processing machine, will achieve the desired color due to formulas that were formulated in advance in order to achieve a desired shade of color from a combination of specified weights of each of a number of masterbatches.

The invention can be used to prepare a mixture of the granules from two or more masterbatches. This mixture can then be melted in an extruder and then passed through a pelletizing machine to produce pellets of a masterbatch that will have a color that is a combination of the original two or more colors. This new masterbatch is sold to a manufacturer who feeds it together with resin and other additives, e.g. to give UV resistance, to a processing machine to manufacture a product having a desired color.

The advantage of this to the masterbatch producer is that he does not have to keep a large inventory of every conceivable shade of masterbatch available but can quickly provide his customers with masterbatches having the color of their choice that he is able to produce from a limited number of color masterbatches. The advantage to the customer is that he receives a masterbatch order for small quantities much faster and at a reduce price to be used at his manufacturing facility.

For a processing company that uses a lot of color additives (masterbatches) the advantage of implementing the new method of the invention for producing the desired shade by either adding a selected combination from a given number of masterbatches into the processing machines or to produce a new homogeneous masterbatch by passing a selected combination of masterbatches through an extruder and pelletizing machine to form new pellets with the desired shade is lower cost made possible by reducing the inventory of many shades of masterbatches, some of which are very expensive since they are ordered in small quantities and rarely ordered.

In the basic configuration of the system, the dispensing is controlled by preset amounts of masterbatches according to the required recipe.

In an alternative configuration, in order to improve the accuracy of the resulting color with respect to the required reference, the dispensing is controlled by external feedback on the color of the resulting product. This can be achieved by using various means such as spectrophotometers, color sensors and similar devices.

Figure 4:
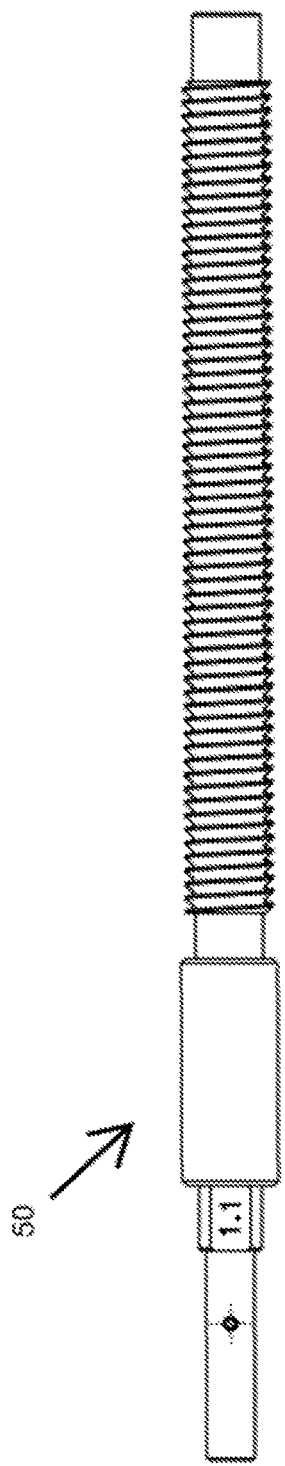
FIG. 4 schematically shows a conventional auger having a very fine pitch.

The invention has been described above for use in the plastic industry; however it can be used in other industries, for example the chemical industry, that have similar requirements. In addition the system can be configured for use with powders by using an auger having a non-conventional fine thread having a pitch of, for example, 3 mm, such as shown in FIG. 4, in the feeding system.

Although embodiments of the invention have been described by way of illustration, it will be understood that the invention may be carried out with many variations, modifications, and adaptations, without exceeding the scope of the claims.

The invention claimed is:

1. A weighing and mixing system for mixing at least two original masterbatches, comprising:
   at least two weighing units, with at least one separate weighing unit for each one of the at least two original masterbatches of, each weighing unit comprising:

a material hopper comprising: at least one first opening, a first feeding mechanism for each first opening, at least one second opening, and a second feeding system for each second opening;
a weighing hopper comprising a flap at the bottom; and
a load cell for weighing original masterbatch contained in the weighing hopper;
a chamber configured to receive weighed original masterbatch from each of the at least two weighing units and to produce a homogeneous mixture; and
a computer configured to control operation of each of the separate weighing units, to supply a predetermined weight of each of the individual original masterbatches to the chamber, to:
open and close each of the at least one first feeding mechanism for the at least one first opening to allow a first controlled amount of original masterbatch that is less than a predetermined weight required for a final batch to fall by gravity from the material hopper through the at least one first opening into the weighing hopper for weighing by the load cell;
after each of the at least one first feeding mechanism is closed, activate the at least one second feeding system of the at least one second opening to cause a second controlled amount of original masterbatch to fall into the weighing hopper for weighing by the load cell; and
when a total weight of original masterbatch weighed by the load cell is equal to the predetermined weight required for the final batch, halt activation of the at least one second feeding system and open the flap at the bottom of the weighing hopper to cause the weighed original masterbatch to flow by gravity into the chamber for mixing with final batches from the other individual weighing units,
wherein the computer is further configured to control operation of the separate weighing units to weigh each of the at least two original masterbatches in parallel,
wherein at least one second feeding system comprises a feed tube and a motor configured to rotate the feed tube, the feed tube comprising a hollow interior section having a tightly fitted compression spring inserted into a front end and an opening to allow granules of original masterbatch that fall from the material hopper through the second opening to enter the hollow interior section,
wherein a diameter of a wire of which the spring is made and a diameter of the interior of the spring are chosen such that when the motor is activated causing the feed tube to rotate about a longitudinal axis, granules of original masterbatch in the hollow interior section of the feed tube travel in single file in a spiral path through the interior of the spring until they reach the end of the spring and drop off one at a time into the weighing hopper,
wherein the feed tube is surrounded by a cylindrical sleeve and a threaded section is created on an outer wall of the feed tube, with threads in the threaded section formed in an opposite direction to that in which the feed tube is configured to rotate in order to push any granules of original masterbatch that attempt to enter the space between the feed tube and the sleeve back towards the opening of the feed tube.

2. The weighing and mixing system of claim 1, wherein each of the at least two weighing units is configured to achieve the predetermined weight required for the final batch with an accuracy of less than 0.03 g.

3. The weighing and mixing system of claim 1, wherein each of the at least two weighing units feeds weighed original masterbatch to the chamber through a common funnel.

4. The weighing and mixing system of claim 1, wherein each feed tube comprises an opening at a position on a circumference of the feed tube, the feed tube opening being positioned to rotate with the feed tube and to align once on each rotation with a second opening of the material hopper so that granules of original masterbatch flow by gravity from the material hopper and into the feed tube.

5. The weighing and mixing system of claim 1, wherein the computer is configured to:
close the at least one first feeding mechanism for the at least one first opening when a weight of the original masterbatch in the weighing hopper is determined, by the load cell, to be 0.1g to 20g less than the predetermined weight required for the final batch;
activate and halt the at least one second feeding system to deliver the second controlled amount of original masterbatch to the weighing hopper to achieve the predetermined weight required for the final batch, as determined by the load cell.

6. The weighing and mixing system of claim 5, wherein the computer is configured to
activate and halt the at least one second feeding system to deliver the second controlled amount of original masterbatch to the weighing hopper to achieve the predetermined weight required for the final batch with an accuracy of less than 0.03g.

* * * * *